(No Model.) 3 Sheets—Sheet 1.

E. J. PENNINGTON.
MOTOR VEHICLE.

No. 574,262. Patented Dec. 29, 1896.

Attest:
F. H. Schott
J. M. Pond

Inventor:
Edward J. Pennington,
by (No Model.) 3 Sheets—Sheet 2.
E. J. PENNINGTON.
MOTOR VEHICLE.
No. 574,262. Patented Dec. 29, 1896.
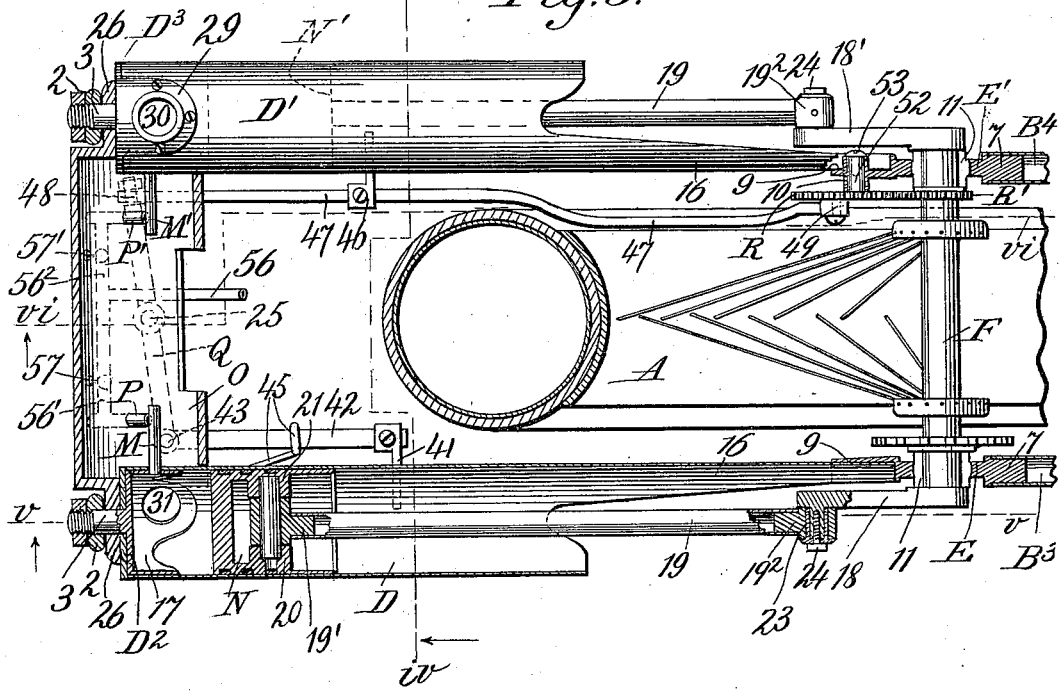
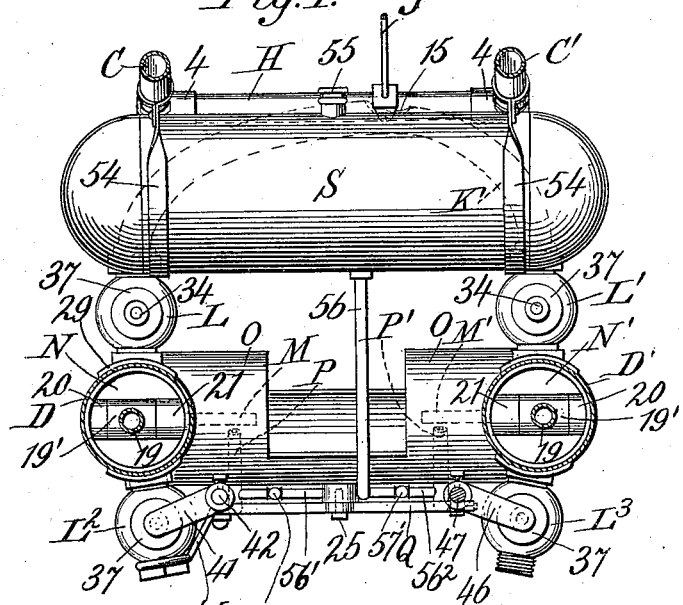
Attest.
H. C. Schott
J. M. Pond
Inventor.
Edward J. Pennington,
by H. W. T. Howard
atty (No Model.) 3 Sheets—Sheet 3.

E. J. PENNINGTON.
MOTOR VEHICLE.

No. 574,262. Patented Dec. 29, 1896.

Attest:
F. H. Schott
J. M. Pond

Inventor:
Edward J. Pennington,
by G. H. W. T. Homan
atty's

UNITED STATES PATENT OFFICE.

EDWARD J. PENNINGTON, OF CLEVELAND, OHIO, ASSIGNOR TO THE MOTOR CYCLE COMPANY, OF CHICAGO, ILLINOIS.

MOTOR-VEHICLE.

SPECIFICATION forming part of Letters Patent No. 574,262, dated December 29, 1896.

Application filed October 3, 1894. Serial No. 524,833. (No model.) Patented in England December 11, 1895, No. 23,771.

*To all whom it may concern:*

Be it known that I, EDWARD J. PENNINGTON, of Cleveland, in the county of Cuyahoga and State of Ohio, have invented certain new and useful Improvements in Wheeled Vehicles, of which the following is a specification, reference being had to the accompanying drawings, and to the letters of reference marked thereon.

This invention is patented in England, in Patent No. 23,771, dated December 11, 1895.

This invention has reference more particularly to light vehicles of the type of bicycles and tricycles provided with explosive-engines carried thereby for propelling the same, but each of the improvements constituting the invention is included for all the uses to which it may be adapted.

It consists in the hereinafter-specified constructions, combinations, and arrangement of parts in the vehicle and in the explosive-engine for use thereon or for other purposes.

Figure 1:
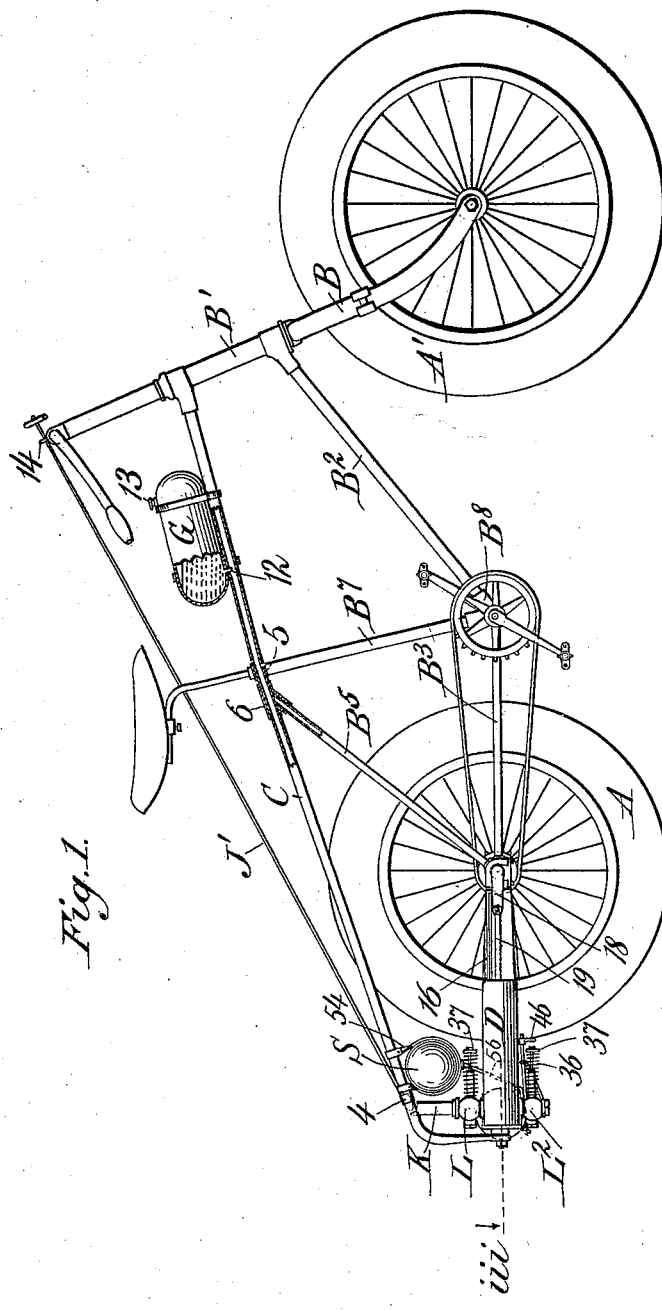
Figure 2:
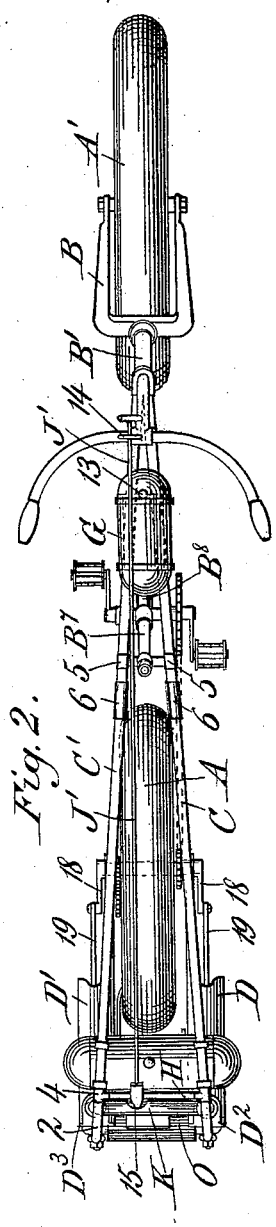
Figure 5:
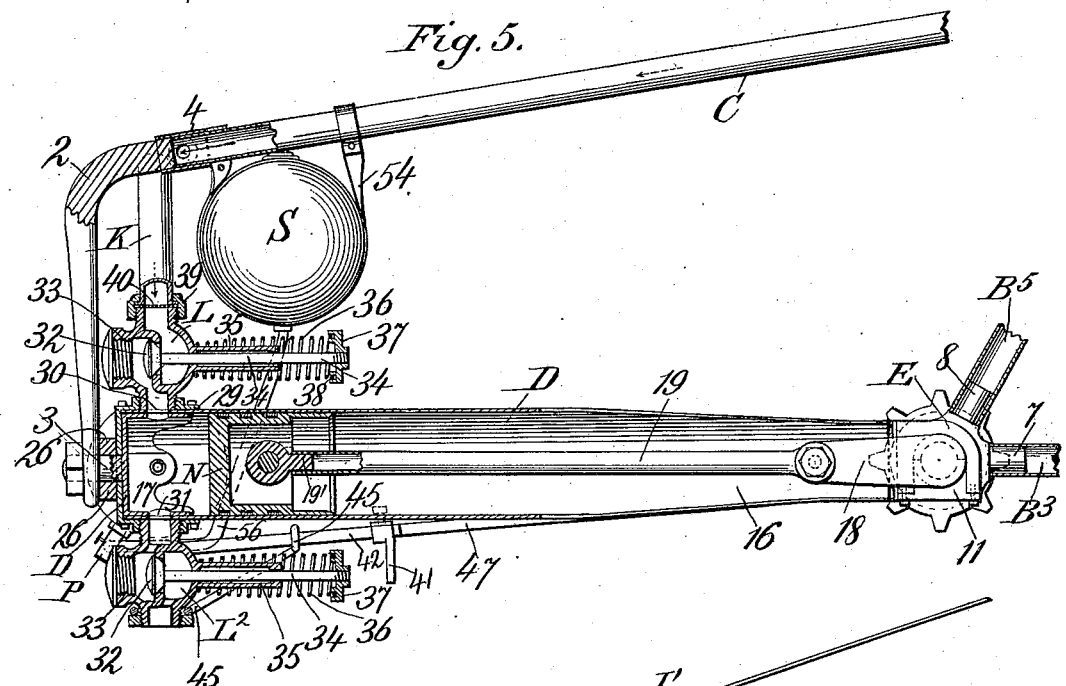
Figure 6:
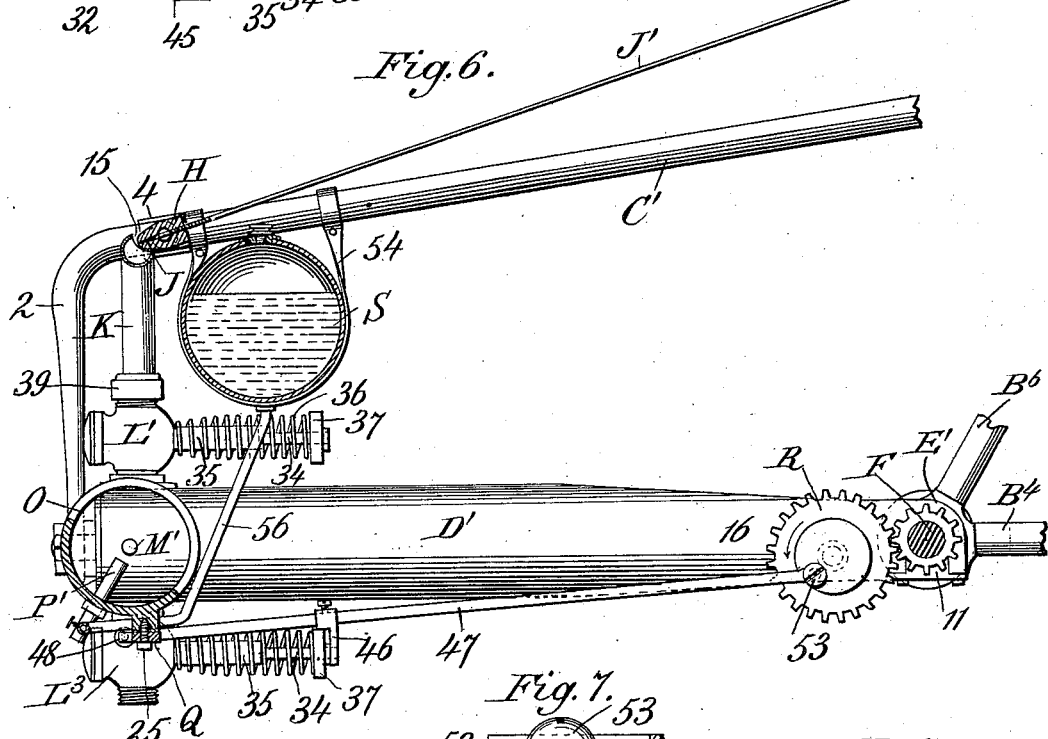
Figure 7:
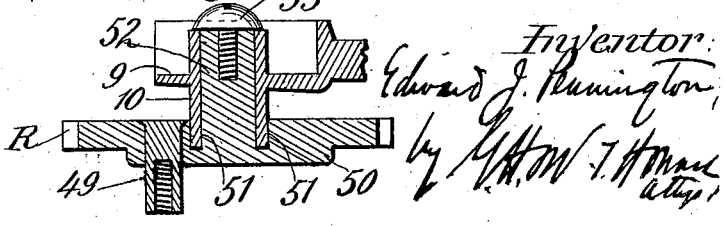

Figure 1 is a side view of the new or improved vehicle. Fig. 2 is a plan view of the same. Fig. 3 is a partial view in horizontal section on line *iii* of Fig. 1, partly in plan. Fig. 4 is a cross-section on line *iv* of Fig. 3. Fig. 5 is a partial longitudinal section on line *v* of Fig. 3. Fig. 6 is a similar view on line *vi*, and Fig. 7 is a detail view.

The wheels A A' are of the ordinary construction, except that they are each provided with a pneumatic tire considerably larger than the ordinary bicycle-tire. The reason for this is found in the importance of eliminating the effects of the common irregularities of the ordinary road-bed to such an extent that the engine may propel the vehicle without danger of slipping or stalling. I have discovered that this can be satisfactorily effected by a pneumatic tire of an extra large diameter (say four inches diameter for a single rider, as shown) on the propelling-wheel A, but preferably pneumatic tires of extra large diameter are used also on the other wheel, (or wheels, in the case of other vehicles than bicycles.) The larger the diameter of the tire the less the pressure per square inch of bearing-surface on the roadway, and by the adoption of about the ratio indicated the pressure is small enough to avoid crushing hardened mud or sinking in sand or the like, which I have found very detrimental to the self-propulsion of vehicles over ordinary roads.

Besides the advantages above pointed out, the use of the enlarged flexible and compressible tire is found necessary to obtain the required traction. Ordinarily the traction necessary in a self-propelling vehicle is gained by giving the vehicle sufficient load, as in a locomotive upon a track. In the present instance load or weight is reduced to the minimum, and the needed traction is, in the absence of sufficient load or weight, only obtainable by means the reverse of such as are ordinarily employed—viz., by increasing the elasticity of the tire of the propelling-wheel, so as to enable a sufficiently large area of its surface to rest flat upon and cover the ground over which the vehicle travels. Besides these functions the enlarged flexible or compressible tire also serves the purpose of an efficient spring, which is required in view of the fact that the vehicle with which it is used is one carrying a motor, and the necessity of preventing jar or shock to the more delicate parts thereof. The greater elasticity, cushioning quality, or compressibility of the tire is obtained not only by giving it greater diameter or area than is ordinarily found in pneumatic tires, but also by subjecting it to less than the usual internal pressure per square inch.

Between the wheels the customary diamond form of frame is shown, and I have embodied in it certain new features or improvements. The forks B, head B', front brace B², lower braces B³ B⁴, back braces B⁵ B⁶, middle brace B⁷, with its seat-rod and seat, and bearing-piece B⁸ for the pedal-shaft are of ordinary or suitable construction. The top braces C C', I have extended back of the seat and combined with the rear ends of the two engine-cylinders D D'. The connection of each brace is made by a bent piece 2, whose perforated lower end fits over a projector 3 on the corresponding cylinder-head D² D³, respectively, and whose upper end is fastened by the coupling 4 to the lower end of the corresponding brace C C', respectively. The braces C C' are each fastened to the middle brace by a loop 5 and to the top of the corresponding back brace $B^4 B^5$, respectively, by a coupling 6.

The bearing-pieces E E' for the axle F of the propelling-wheel are of a new or improved construction, being each provided with horns 7 and 8 for the lower and back braces, which are of steel tubing. It is preferred to make these solid to fit into the hollow ends of the braces; but they could be made hollow to receive the braces. Further, each of said bearing-pieces is provided with a seat 9 for the front end of the engine-cylinder, and the piece E' is also provided with a bearing 10 for a valve-gear to be described below. Each bearing-piece could be provided with such bearings; but as I find it advantageous to operate the valves of both engine-cylinders from one gear, only the one piece E' is shown as so provided.

It is preferred to use a removable block 11, Figs. 2, 4, and 5, under each end of the axle F to allow this to be readily inserted and removed when desired.

In making bicycles and similar vehicles self-propelling it is desirable to reduce the weight, and in order to effect this the hollow frame of the vehicle (or such portion or part thereof as may be thought available) is made to constitute or form part of the reservoir for the gasolene or other combustible fluid. As shown, the top braces C C' make part of such reservoir. In order to carry a larger supply of fluid, a can G is mounted on the frame and connected by a nipple 12, Fig. 1, with one of the fluid-holding braces. A hollow cross-piece H forms a brace and also a pipe connection between the fluid-holding braces at their lower ends. The couplings 4 unite the cross-pieces to the braces. At 13 is the filling-opening of the can G.

In the cross-piece H is the conical orifice and threaded cylindrical opening for the needle-valve J, which regulates the delivery of the gasolene. This needle-valve has a threaded stem engaging the threaded opening and the tapering point within the conical orifice, as usual in needle-valves, the turning of the stem inserting the point more or less deeply into the orifice to check or cut off or to start or increase the delivery from said orifice. The needle-valve is formed at the end of a flexible valve-rod J', which is extended forward and provided with a handle or other operating means within reach of the rider. Its forward end is upheld by the handle-bar, the valve-rod passing loosely through a loop 14. The valve-rod therefore does not interfere with the turning of the handle-bar nor with its vertical adjustment. Such a valve-rod as described might be used to operate any suitable form of fluid-delivery valve, and the described arrangement of needle-valve could be used with any suitable operating means, although it is an advantage and a special improvement to use the valve-rod and the needle-valve arrangement in connection with each other. The gasolene or other fluid drips from the orifice into the opening 15 (see Figs. 2 and 6 and dotted lines in Fig. 4) at the top of the arched pipe K, wherein the vapors are mixed with air in explosive proportions, and whereby such explosive mixture is conveyed to the engine-cylinders through valve to be described below.

In order to reduce the weight of the engine and to favor the conduction of heat from the engine-cylinders, these (D D', respectively) are made each of a steel tube cut away at one end to leave a projecting tongue 16 for attachment to the bearing E or E' of the engine crank-shaft F, which, as shown, is also the axle of the vehicle-wheel A. The seats 9 are curved (or concave on their faces) to fit the curvature in cross-section of the tongue 16. The curvature of the tongue 16 increases its strength as well as facilitates the manufacture of the tongued cylinder. The engine-cylinders being single-acting, the front ends are left open. The rear ends are closed by the heads $D^2 D^3$, which carry the valves L L' $L^2$ $L^3$ and ignition-tubes M M', and which also reinforce the steel tubes at the explosive end by means of a flange 17 for each tube or cylinder. The ignition-tubes are small tubes of platinum or other suitable material, closed at their outer end and opening each into one cylinder at the inner ends. They are kept hot at the proper point to insure ignition of the explosive mixture in the cylinders when fully compressed, as well understood in the art.

In each cylinder moves a hollow piston N or N', which is connected by the pitman with the crank 18 18' at the corresponding end of the shaft or axle F. The pitmen are each best made of a small steel tube 19, with end pieces 19' and $19^2$ of thicker material. The rear end piece 19' fits between bosses 20 and 21 on the inside of the hollow piston, with which it is connected by the journal-pin 22. The front end piece is loosely connected with the pin of crank 18 or 18', a bushing 23 being advantageously interposed. This bushing fits between the end piece and the crank-pin with sufficient looseness to turn freely and has inwardly and outwardly turned flanges, which overlap the respective parts. A screw 24, tapped into the crank-pin, holds all in place.

The rear ends of the cylinders D D' are connected with each other by means of the chambered cross-piece O. This, as shown, has several functions. It forms a cross-brace between the rear ends of the cylinder and also between the rear ends of the top braces C C'. It forms chambers for inclosing and protecting the ignition-tubes M M'. It forms supports and protectors for the burners P P'. It forms a support for the rock-bar Q, pivoted at 25 to a boss on the under side of the said cross piece O and forming part of the exhaust-valve mechanism as explained below. On top the middle portion of this cross-piece is cut away, as seen best in Fig. 4, so as to allow the escape of the products of combustion from the burners P P', and if necessary to supply air for their combustion. The burners P P' may take air from outside through the burner-tubes, as in the familiar Bunsen burner, and the orifices for the escape of the products of combustion need not be made just as shown. Ears 26 on the piece O fit over the projections 3 between the bent pieces 2, forming the lower ends of the top braces C C' and the heads $D^2$ $D^3$. The heads $D^2$ $D^3$ are each made double, the inner plate being made integral with the projection 3 and also with the flange 17, which enters the cylinder-tube. The outer plate has projections 29, which fit outside the cylinder. The inlet-port 30 and outlet-port are each made through the flange 17, the cylinder-tube, and the corresponding projection 29, and so, also, is the hole for the ignition-tube M or M', only there is preferably no outside projection corresponding to 29 for the ignition-tube.

The inlet and outlet valves L L' $L^2$ $L^3$ are each screwed into a threaded opening in a projection 29. They each include (see Fig. 5) a chambered body with the opening and seat for the valve-disk 32 in the partition between the chambers, also with a lateral opening 33 the full diameter of the valve-disk and in line with the valve-stem 34, and with an elongated hollow cylindrical extension 35, also in a line with the valve-stem. The opening 33 is provided with a closure shown as a screw-plug. A spiral compression-spring 36 surrounds this extension, (through which the valve-stem passes and by which it is guided.) It presses at its inner end against the body of the valve and at its outer end against a disk 37 on the end of the valve-stem. In this disk is an annular groove 38, which receives the end coil of the spring 36.

Inlet-valves L L' open inward (that is, toward the engine-cylinder) and are opened by the atmospheric pressure when a sufficient vacuum is made in the corresponding engine-cylinder and closed by the spring when there is no such vacuum.

To the top of the valve one end of the arched pipe K is secured by a union 39, with a disk 40, of gauze or perforated metal, interposed. One end of the pipe K is fastened to the top of the valve L and the other end to the top of valve L', (see Fig. 4,) so that the same fluid-delivery valve J serves for both cylinders.

The exhaust-valves $L^2$ $L^3$ open inward also and are opened by valve mechanism and closed by the springs. To open the valve $L^2$, there is a tappet 41 on the valve-rod 42, whose rear end is jointed at 43 to the rock-bar Q and which is guided by an eye of the guide-piece 45, fastened by a nut on the lower tubule of valve $L^2$. The tappet strikes the end of the valve-stem and forces it and the valve-disk inward against the pressure of the spring.

To open the valve $L^3$, a tappet 46 is provided in the valve-rod 47, whose rear end is jointed at 48 to the corresponding end of rock-bar Q and whose front end is loosely connected with the crank-pin 49 of the valve-gear R. This gear is double the diameter of the pinion R' on the shaft F, so that the exhaust-valves are opened once in every two reciprocations of the corresponding piston N or N'.

The gear R is shown (see Fig. 7) as provided with a boss 50 to hold the valve-rod 47 away from the gear-teeth and to give a longer bearing in this gear to the crank-pin 49. It is provided with an annular groove 51 to receive the end of tubular bearing 10 and with a pin 52 to enter said bearing. A screw 53, tapped into the pin 52, holds the gear in place, the under side of the screw-head bearing against the opposite end of the bearing 10. This special arrangement is advantageous, but it could be replaced by another arrangement if its advantages are not desired, and the same remark applies to other particular constructions shown in the drawings and particularly described.

At S is a can of gasolene or other combustible fluid for supplying the burners P P'. It is upheld by straps 54 from the top braces C C' and has a filling-opening 55. A feed-pipe 56 conducts the fluid to the branches 56' and $56^2$, which lead to the respective burners. A stop-cock 57 and 57' in the branches controls the supply to each burner.

The operation is as follows: The cans G S being each supplied with proper fluid, the burners P P' are lighted to heat the ignition-tubes M M'. Then the rider, adjusting the needle-valve J and mounting the machine, starts the wheel A and shaft F turning. Assuming that the parts are in the position shown, the pistons N N' are both drawn forward by the cranks 18 18' and pitmen 19. If both cylinders are empty, a mixture of air and gasolene vapors is drawn into both cylinders through the arched pipe K and the inlet-valves L L'. As the end of the forward stroke is reached the springs close the inlet-valve. During this movement or half-revolution of the shaft F the valve-pin 49 has made a quarter-revolution, removing the tappet 46 from the stem of the valve $L^3$ and so rocking the bar Q as to bring the tappet 41 against the stem of the valve L'.

The pistons N N' are moved back together, and the tappet 41 forcing open the valve L' the contents of cylinder D are exhausted, while the contents of cylinder D' are compressed because the valve $L^3$ is closed. The compression takes place also in the ignition-tube M', and when it is complete the explosive mixture reaches the part of said tube which is sufficiently heated to ignite the mixture and cause it to explode. The pistons having now reached the inner (or rear) end of their stroke, the force of the exploded and expanded mixture in cylinder D' forces the piston N' forward and turns the shaft F, propelling the vehicle. During this forward movement the piston N sucks in from the arched pipe K a charge of the explosive mixture, its exhaust-valve $L^2$, as well as the valve L³, being closed during this movement. During the next inward movement of the pistons N N' the valve L³ is opened and the valve L² closed, so that the contents of cylinder D' are exhausted and those of cylinder D compressed. The parts are now again in the position shown in the drawings. The compression of the explosive mixture in cylinder D forces it into the ignition-tube M until it catches fire and explodes, forcing the piston N outward and through the shaft F, drawing the piston N', so as to suck an explosive charge into the cylinder D', to be in turn compressed and exploded.

In order to effect the compression of the explosive mixture in the cylinders D D', it is evident that some force is necessary. In ordinary gas-engines a heavy fly-wheel has been employed to store force from each explosion sufficient to effect the next compression. Sometimes the force of an explosion has been made directly to effect the subsequent compressions. It is found unnecessary to use either of these expedients and the vehicle may therefore be made much lighter. The weight of the rider has been found available to store power for effecting the compression. This is an advantage not only in saving weight, but it makes the vehicle self-stopping when the rider dismounts, the weight of the vehicle alone being insufficient to effect the compression.

I claim as my invention or discovery—

1. The combination with the shaft of a propelling-wheel, of a pair of explosion-engine cylinders whose pistons are connected with the said shaft, and a frame having top braces extended back of the seat to the rear ends of the engine-cylinders and cross-braced at or near the rear ends of said braces, substantially as described.

2. A bearing-piece having a shaft bearing therein and a seat for an engine-cylinder behind said bearing, in combination with such cylinder provided with a projecting tongue seated in said bearing-piece, substantially as described.

3. A bearing-piece having a shaft bearing therein and provided with one or more horns in front of said bearing and a seat for the front end of an engine-cylinder behind said bearing, in combination with a brace or braces of a vehicle-frame secured to said horn or horns, an engine-cylinder having a projecting tongue seated on said bearing-piece, a brace extending to the rear end of said cylinder, and connections between the last-mentioned and the before-mentioned braces, substantially as described.

4. In combination with an explosion propelling-engine, a hollow vehicle-frame having a valve-controlled pipe connection with said engine, so that said frame forms part of the combustible-fluid reservoir, and also provided with a can opening into the hollow part of said frame, substantially as described.

5. In connection with an explosion-engine cylinder, a hollow brace forming a part of the frame of a vehicle and having a mechanical connection with said cylinder for upholding the said cylinder and also a valve-controlled pipe connection with said cylinder, substantially as described.

6. The two top braces, the cross-piece, and the valve on said cross-piece, in combination with the wheels and main frame of a vehicle, and an explosion propelling-engine whose fluid-supply is controlled by said valve, substantially as described.

7. The combination with a wheeled vehicle, and an explosion propelling-engine, of a flexible valve-rod supported at one end on the handle-bar or guiding means of said vehicle and there provided with a handle within reach of the rider, substantially as described.

8. The combination with a wheeled vehicle, of a needle-valve, arranged at the back of the vehicle, a flexible valve-rod extending forward in continuation of the needle of said valve to within reach of the rider, and the parts—as the cylinder, piston, inlet and exhaust valves—which make with the said needle-valve an explosion propelling-engine, substantially as described.

9. The cylinder of steel tubing having the end cut away to form a tongue, and provided with a head which carries the inlet and exhaust valves and reinforces the explosion end of said cylinder, substantially as described.

10. The cylinder of steel tubing having the end cut away to form a tongue, and provided with a head which carries the inlet and exhaust valves and reinforces the explosion end of said cylinder, in combination with supports for upholding the said cylinder through said tongue and said head, substantially as described.

11. The combination with a cylinder of steel tubing having the end cut away to leave a tongue of curved cross-section, of a support having a seat for said tongue of corresponding curvature, substantially as described.

12. The combination with the pitman of a propelling-engine, and the cranked axle, of a bushing interposed between the end of said pitman and the crank-pin and provided with internal and external flanges which overlap said parts respectively, substantially as described.

13. The combination with a wheeled vehicle, two engine-cylinders on opposite sides of a wheel, supports for the front ends of said cylinders, top braces connected with the rear ends of said cylinders, and a cross-piece connecting the rear ends of the cylinders with each other and forming a brace between them, substantially as described.

14. The combination with two engine-cylinders, of a chambered cross-piece between them, and the ignition-tubes in said cross-piece, substantially as described.

15. The combination with two engine-cylinders, of a chambered cross-piece between them, and the burners supported on said cross-piece with their flame ends within the same, substantially as described.

16. The combination of the two engine-cylinders, the top braces connected with the rear ends of said cylinders, the supports for the ends of said cylinders, the chambered cross-piece between them, and devices for effecting the explosion—such as the ignition-tubes and burners—within said cross-piece, substantially as described.

17. The combination of the two engine-cylinders, the chambered cross-piece between them, and devices for effecting the explosion—such as the ignition-tubes and burners—within said cross-piece, substantially as described.

18. The combination with the two engine-cylinders, the cross-piece between said cylinders, a rock-bar pivoted to said cross-piece, valve connections at opposite ends of said rock-bar, and valves operated by said connections, substantially as described.

19. The combination of the engine-cylinders, the chambered cross-piece between the cylinders, explosion devices—such as ignition-tubes and burners—within said cross-piece, a rock-bar pivoted to said cross-piece, valve connections at opposite ends of said rock-bar, and valves operated by said connections, substantially as described.

20. A valve for an explosion-engine, consisting of a chambered body with the opening and seat for the valve-disk in a partition between the chambers, a lateral opening the full diameter of said valve-disk provided with a closure, and an elongated hollow cylindrical extension, in connection with the valve-disk, stem, and spring, substantially as described.

21. The combination with the cylinder, and other parts of an explosion-engine, of one or more valves each consisting of a chambered body with the opening and seat for the valve-disk in a partition between the chambers, a lateral opening the full diameter of said valve-disk provided with a closure, and an elongated hollow cylindrical extension, in connection with the valve-disk, stem, and spring, substantially as described.

22. The combination with the two engine-cylinders, of the automatic inlet-valves, spring-held inwardly-opening exhaust-valves, the valve-rods and tappets, and the rock-bar between the said rods, substantially as described.

23. The combination with the two engine-cylinders, and the inlet-valves, of the explosive-mixture pipe between the said valves, and means for admitting air and delivering a regulated supply of combustible fluid into said pipe, substantially as described.

24. The combination with a wheeled vehicle, and a double-cylinder propelling-engine having an inlet-valve for each cylinder, of the explosive-mixture pipe between the inlet-valves, and means for admitting air and delivering a regulated supply of combustible fluid into said pipe, the said means including a handle within the rider's reach which regulates the supply for both cylinders, substantially as described.

25. The combination with a wheeled vehicle, of the double-cylinder propelling-engine having the cylinders supported at their front and rear ends and connected at their rear ends by a cross-piece, the pinion and valve-gear, the valve-rods, the rock-bar pivoted on said cross-piece, and the means for operating the exhaust-valve through said valve-rods and rock-bar, substantially as described.

26. The combination of the wheels, frame, engine-cylinders, cross-pieces, valves, valve-operating means, and explosion devices, such as ignition-tubes and burners, said frame having hollow top braces connected by a cross-piece, the fluid-delivery valve being arranged in one cross-piece, and explosion devices being placed in another cross-piece which is chambered, substantially as described.

In testimony whereof I hereto set my hand and seal.

EDWARD J. PENNINGTON. [L. S.]

Witnesses:
WILL. H. BROWN,
J. M. POND.